US007181332B1

(12) United States Patent
Vick et al.

(10) Patent No.: US 7,181,332 B1
(45) Date of Patent: Feb. 20, 2007

(54) METHOD FOR CONTROLLING AN OPERATING CONDITION OF A VEHICLE ENGINE

(75) Inventors: Roger K Vick, Troy, MI (US); Michael J Prucka, Grass Lake, MI (US); Timothy A Coatesworth, Lake Orion, MI (US); Denise M Kramer, Macomb, MI (US); Eugenio DiValentin, Brighton, MI (US); Gregory L Ohl, Ann Arbor, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/257,673

(22) Filed: Oct. 25, 2005

(51) Int. Cl.
*B60T 7/12* (2006.01)
*F02B 75/02* (2006.01)

(52) U.S. Cl. .................... 701/103; 73/117.3; 73/118.1; 123/316; 123/406.45; 123/568.14; 701/108

(58) Field of Classification Search ................ 701/103, 701/108, 110; 73/117.3, 118.1, 118.2; 123/316, 123/406.45, 406.48, 568.14, 568.21
See application file for complete search history.

(56) References Cited

U.S. PATENT DOCUMENTS

| | | | | |
|---|---|---|---|---|
| 5,154,878 | A * | 10/1992 | Busigin et al. | 376/310 |
| 6,230,683 | B1 * | 5/2001 | zur Loye et al. | 123/435 |
| 6,276,334 | B1 * | 8/2001 | Flynn et al. | 123/435 |
| 6,286,482 | B1 * | 9/2001 | Flynn et al. | 123/435 |
| 6,725,847 | B2 * | 4/2004 | Brunemann et al. | 123/568.12 |
| 6,915,776 | B2 * | 7/2005 | zur Loye et al. | 123/304 |
| 2003/0192516 | A1 * | 10/2003 | Brunemann et al. | 123/568.12 |

* cited by examiner

*Primary Examiner*—John T. Kwon
(74) *Attorney, Agent, or Firm*—Ralph E. Smith

(57) ABSTRACT

A residual ratio factor characterizing the amount of residual exhaust gas left in a selected cylinder at the end of a piston intake stroke is determined from tabular and surface models based on previously gathered dynamometer data from a test vehicle at various engine speeds. The residual ratio factor is then used to calculate the mole fractions of air and residual exhaust gas in the selected cylinder, which, in turn, are used to determine mass airflow at an engine intake port at the end of the intake stroke. The mass airflow can then be used to derive further models for determining an engine operating parameter, such as fuel/air ratio, required for achieving at preselected vehicle operating condition.

14 Claims, 7 Drawing Sheets

METHOD FOR CONTROLLING AN OPERATING CONDITION OF A VEHICLE ENGINE

FIELD OF THE INVENTION

The present invention generally relates to vehicle engine control systems. More specifically, the invention pertains to fueling adjustments based on airflow models derived from test vehicles dynamometer data.

BACKGROUND OF THE INVENTION

Conventional airflow models for use in computer control of vehicular engines suffer from the fact that gas densities and volumetric efficiencies used in control algorithms are not constant, thereby requiring use of complex error correction factors. Such correction factors, in turn, are highly dependent on hard-to-achieve precise measurements of engine operating parameters, such as manifold absolute pressure. Additionally, prior approaches require complex combinations of software tabular and surface data to properly calibrate the controller to estimate normally unmeasured parameters, such as cylinder temperature.

The complexity of cylinder temperature calibration requires large amounts of time in specialty dynamometer cells generating huge data sets for calibration and verification. Advanced engine systems utilize devices which affect exhaust gas residual content in a selected cylinder at the completion of an intake stroke. These devices typically include variable valve timing devices or manifold tuning valves and all require complex modifiers to parameters such as volumetric efficiency to obtain acceptably useful calibration.

Hence, there is a need for an improved model approach to modeling volumetric efficiency and gas density for use in controlling operating conditions of a vehicle engine.

SUMMARY OF THE INVENTION

A method for controlling an operating condition of a vehicle engine includes determining a residual ratio factor from dynamometer data generated by a test vehicle engine at various engine speeds; calculating mole fractions of air and residual exhaust gas in a selected cylinder of the engine at completion of an intake stroke for the selected cylinder, the calculation being a function of engine speed and the residual ratio factor; using the mole fractions of air and residual exhaust gas to determine mass air flow of the engine; and using the determined mass air flow to estimate an operating parameter of the vehicle engine required to achieve a desired vehicle operating condition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The method of the invention is based on model refinements to both volumetric efficiency and gas density. We begin by defining the volumetric efficiency as the ratio of the actual cylinder volume to the cylinder volume upon intake valve closure for that cylinder. This definition is consistent with the classical definition of a mole fraction and therefore the refined definition of volumetric efficiency is equal to the mole fraction of air in the cylinder. Neglecting fuel, we presume that the contents of a selected cylinder upon closure of the intake valve are limited to air and exhaust gas residual. Hence, the mole fraction of the residual exhaust gas is simply 1—the mole fraction of air. Conversely, the mole fraction of air is given by 1—the mole fraction of the residual exhaust gas. Hence, since the method uses a model of the residual exhaust, the mole fraction of air is calculated from the determined mole fraction of the residual exhaust.

Knowing the relative amounts of air and residual exhaust gas from the residual model and the temperatures of same, it then becomes possible with the method of the invention to calculate the actual temperature of the mixed air and residual exhaust gas in a selected cylinder upon closure of the intake valve, thereby eliminating a great deal of calibrating data harvesting required with conventional approaches.

Figure 1:
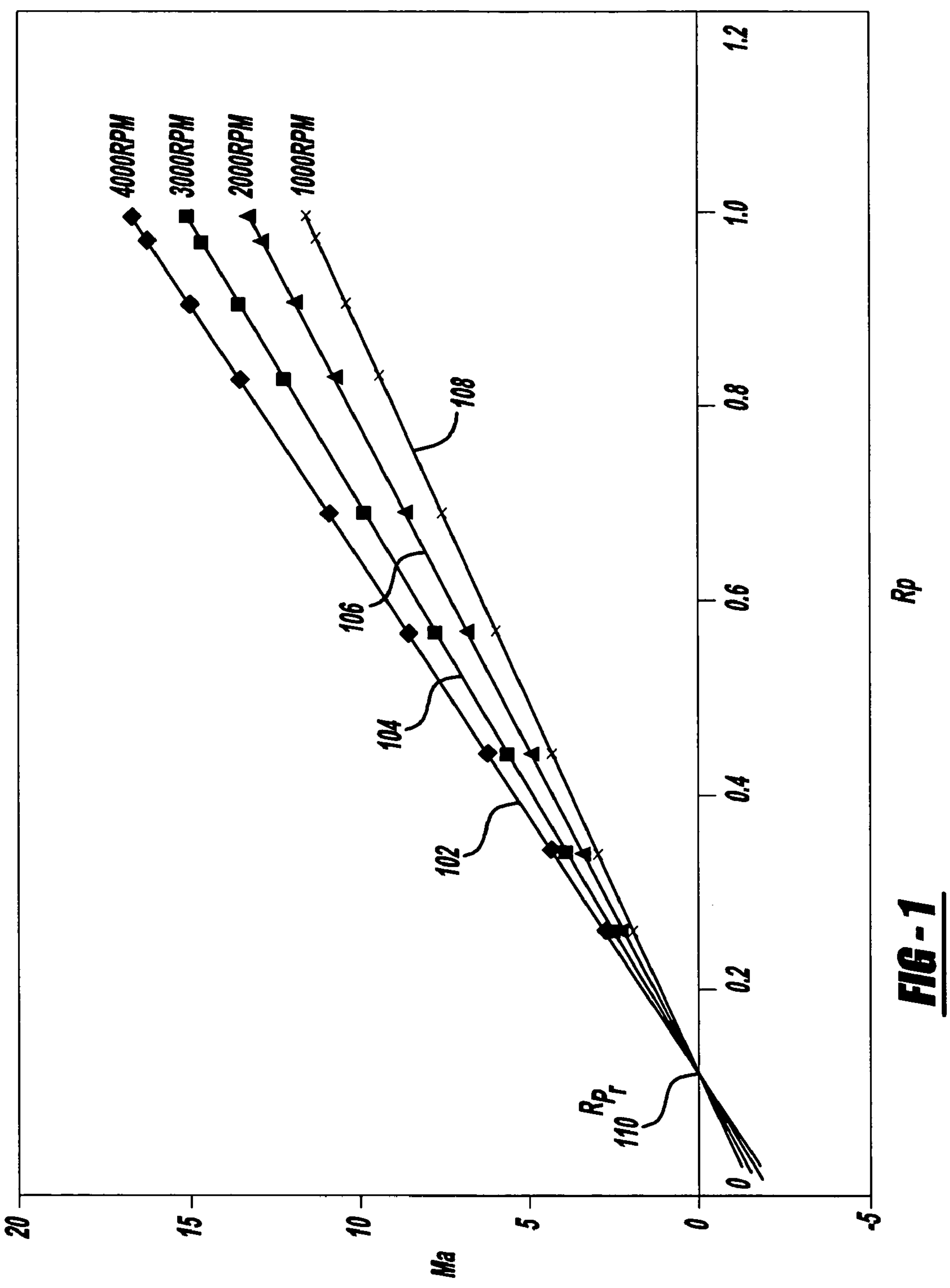
FIG. 1 is a graph depicting dynamometer data used to obtain residual ratio factors in accordance with the principles of the invention.

The only remaining unknown then becomes the cylinder pressure at intake valve closure, which is calculated from manifold absolute pressure (MAP), engine speed and intake manifold gas temperature. This pressure is then calibrated to provide the measured airflow. The residual based model of the invention begins with collecting data from which a residual partial pressure ratio factor can be determined. With reference to FIG. 1, a graph is shown of collected data points for various engine speeds where mass airflow Ma is plotted versus a pressure ratio $R_p$ of manifold absolute pressure to barometric pressure. The pressure ratio at zero mass airflow, or the X intercept of the various engine speed data graphs is shown at 110. This intercept yields the residual partial pressure ratio, $R_{p_r}$, for various engine speeds. While only a single point 110 is shown in FIG. 1, it is to be noted that in the real world situation, the X intercepts for each of the speed graphs (i.e., 1000 rpm, 2000 rpm, etc.) are separate crossover points. Hence, if the engine speed is known in the engine control algorithm, a table lookup procedure can be utilized from dynamometer data such as that shown in FIG. 1 to derive the residual partial pressure ratio factor $R_{p_r}$.

Therefore in its broader aspects, the method begins by determining a residual ratio factor, such as the residual partial pressure ratio 110 of FIG. 1, from dynamometer data generated by a test vehicle engine at various engine speeds.

The method calculates a mole fraction of air and residual exhaust gas in a selected cylinder of the engine at completion of an intake stroke for the selected cylinder, the calculation being a function of engine speed and the residual ratio factor. The mole fractions of air and residual exhaust gas are used to determine mass airflow of the engine and the determined mass airflow is then used to estimate an operating parameter of the vehicle engine required to achieve a desired vehicle operating condition, such as fuel to air ratio, spark timing, or engine output torque.

In a more detailed example of the method of the invention, an operating condition of a vehicle engine is controlled by first calculating mole fractions of residual exhaust and air in a selected cylinder of the engine at the end of that cylinder's intake stroke. Gas pressure in the selected cylinder is calculated upon closure of the intake valve. The temperature of the mixed intake air and residual exhaust gas resident in the selected cylinder upon the closure of the intake valve is then calculated, and then mass airflow at an intake port of the engine is calculated using the calculated gas pressure and calculated gas temperature and the mole fraction of air for a selected cylinder. Using the mass airflow, an estimate is made of an operating parameter of the vehicle engine to achieve a preselected vehicle operating condition. The details of each of these steps are illustrated below with reference to FIGS. 2–7.

Figure 2:
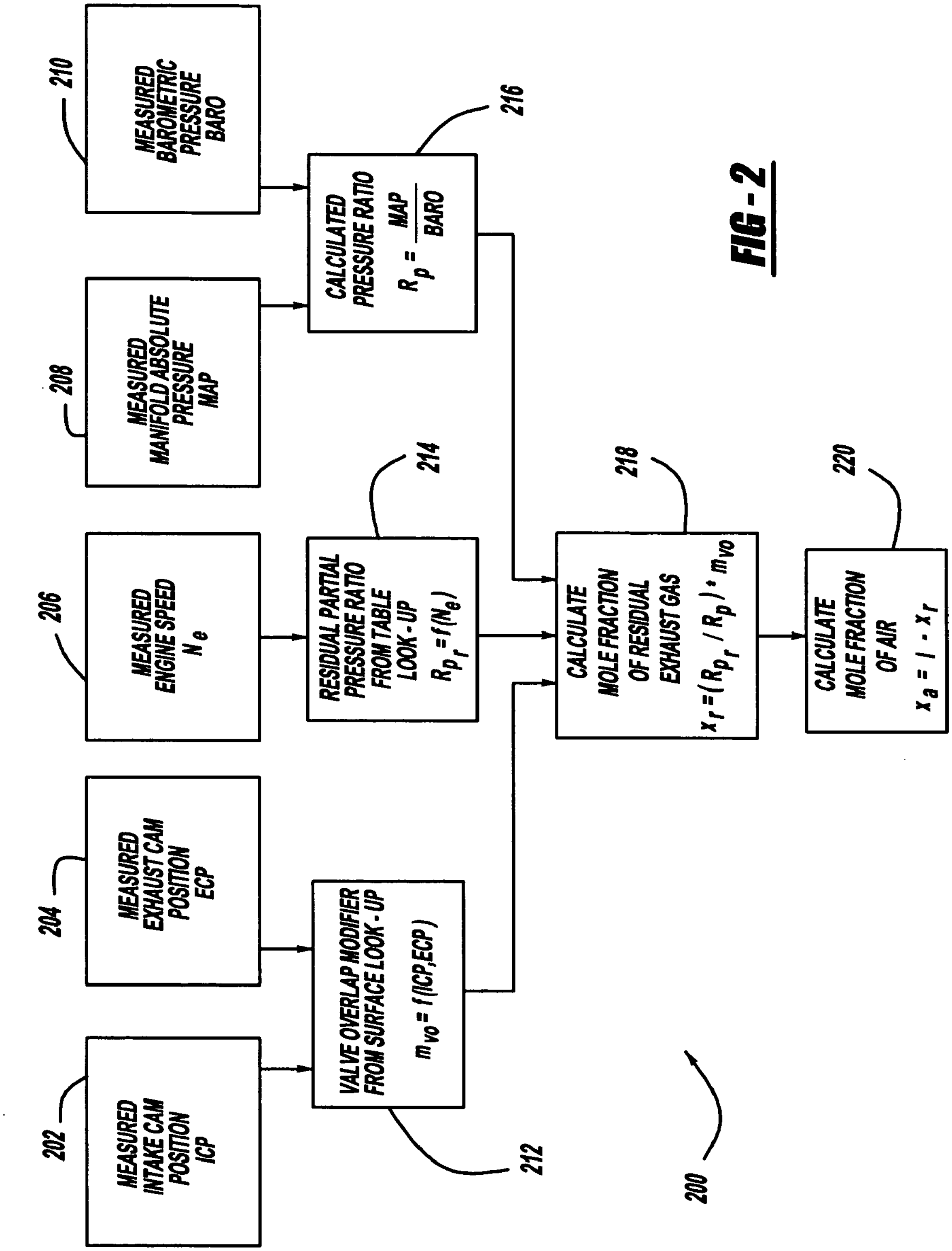
FIG. 2 is a model setting forth parameter determinations and calculations used by the method of the invention for obtaining the mole fractions of air and residual exhaust gas in a selected cylinder at the end of an intake stroke.

With reference to FIG. 2, a block diagram 200 sets forth the determination of residual exhaust and air mole fractions in a selected cylinder of the engine using tabular and/or surface models, measured engine parameters and calculations.

The basic inputs to the determination of mole fractions in FIG. 2 are intake cam position at block 202, exhaust cam position at block 204, engine speed at block 206, manifold absolute pressure at block 208 and barometric pressure at block 210.

Using the intake and exhaust cam positions, a valve overlap modifier is calculated at block 212 according to $$m_{vo}=f(ICP,ECP)$$

The above function is derived from lookup tables representing a three-dimensional surface.

At block 214 a residual partial pressure ratio is derived from a table lookup and is a function of engine speed $$R_{p_r}=f(N_e).$$

At block 216 a pressure ratio is calculated according to $$R_p=MAP/BARO$$

where MAP is manifold absolute pressure and BARO is barometric pressure.

The valve overlap modifier, residual partial pressure ratio and the pressure ratio are then used at block 218 to calculate the mole fraction of residual exhaust gas in the selected cylinder in accordance with $$X_r=(R_{p_r}/R_p)*m_{vo}.$$

Finally, at block 220 the mole fraction of air is derived from the mole fraction of residual exhaust gas assuming that air and exhaust are the only two gases resident in the cylinder at the end of the intake stroke $$X_a=1-X_r.$$

Figure 3:
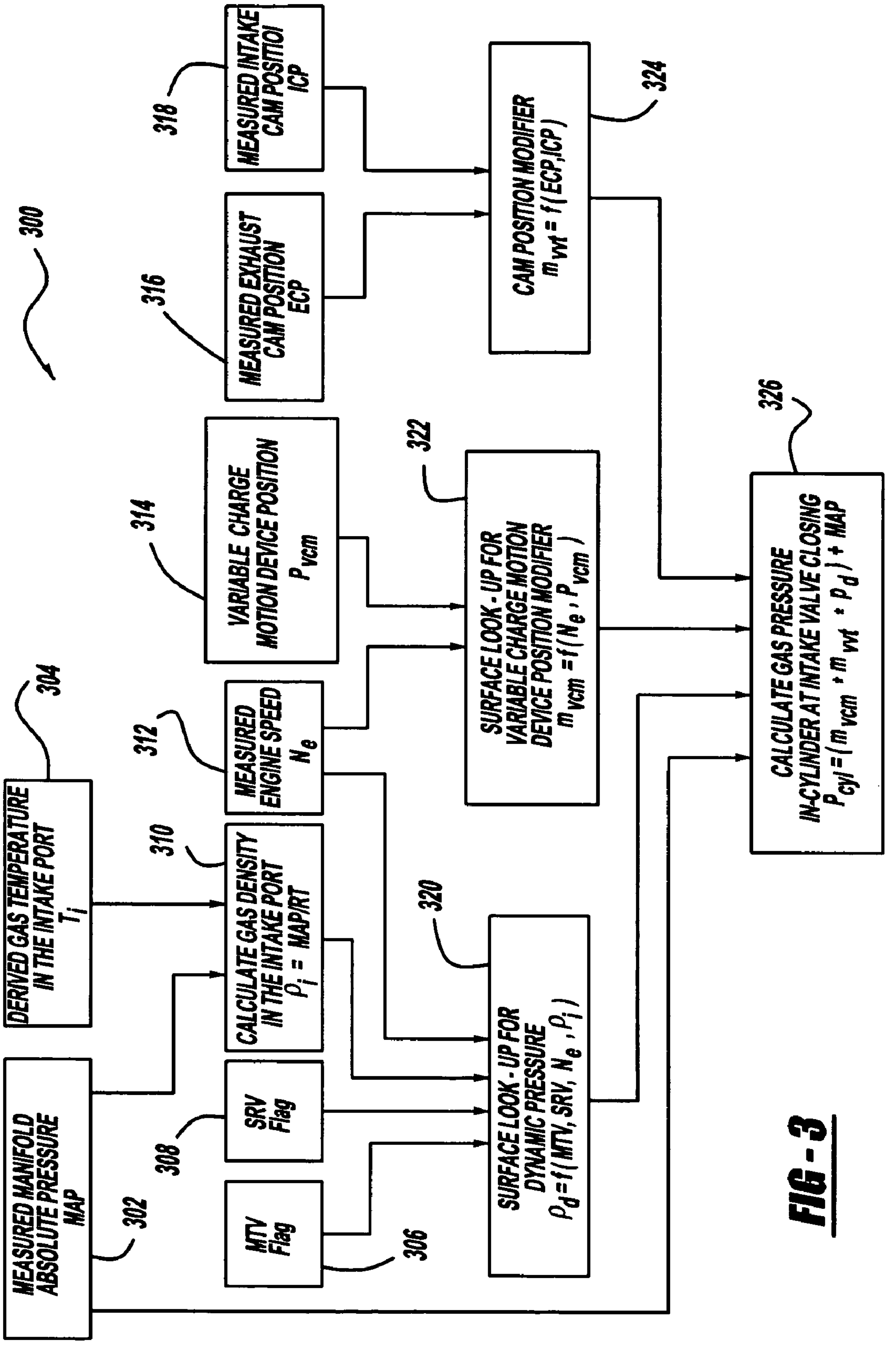
FIG. 3 is a model for obtaining gas pressure in the selected cylinder at the end of the intake stroke.

FIG. 3 sets forth a block diagram 300 showing the determination of gas pressure in the selected cylinder at intake valve closure using tabular and/or surface models, measured engine parameters and calculations.

The basic inputs for the determination of gas pressure in the cylinder at intake valve closing are manifold absolute pressure at block 302, gas temperature at the engine intake port at block 304 which is derived from a variety of surface and tabular lookups, engine speed at block 312, the position of a variable charge motion device at block 314, the exhaust cam position at block 316 and the intake cam position at block 318. A variable charge motion device is an element in advanced engine systems located in the intake manifold or intake port close to the valve which blocks part of the port with the intent of promoting or increasing gas motion. Additional inputs are a manifold tuning valve flag at block 306 and a short runner valve flag at block 308. These flags serve to indicate the state of these valves which are also present in some advanced engine systems for providing intake manifold tuning features.

At block 310 gas density in the intake port is calculated according to $$\rho_i=MAP/RT_i$$

where R is the universal gas constant and $T_i$ is gas temperature in the intake port.

At block 320 dynamic pressure in the cylinder is derived from a model comprising a surface representation and is a function of the states of any manifold tuning valve MTV or short runner valve SRV present in the system, engine speed $N_e$ and the calculated gas density in the intake port, or $$P_d=f(MTV,SRV,N_e,\rho i).$$

At block 322 a variable charge motion device position modifier $m_{vcm}$ is derived from a surface lookup model and is a function of engine speed and the position $p_{vcm}$ of the variable charge motion device, or $$m_{vcm}=f(N_e,p_{vcm}).$$

At block 324 a cam position modifier $m_{vvt}$ is derived from a surface model and is a function of the exhaust cam ECP and intake cam ICP positions or $$m_{vvt}=f(ECP,ICP).$$

At block 326 gas pressure at the cylinder of interest at intake valve closing is calculated in accordance with $$P_{cyl}=(m_{vcm}*m_{vvt}*P_d)+MAP.$$

Figure 4:
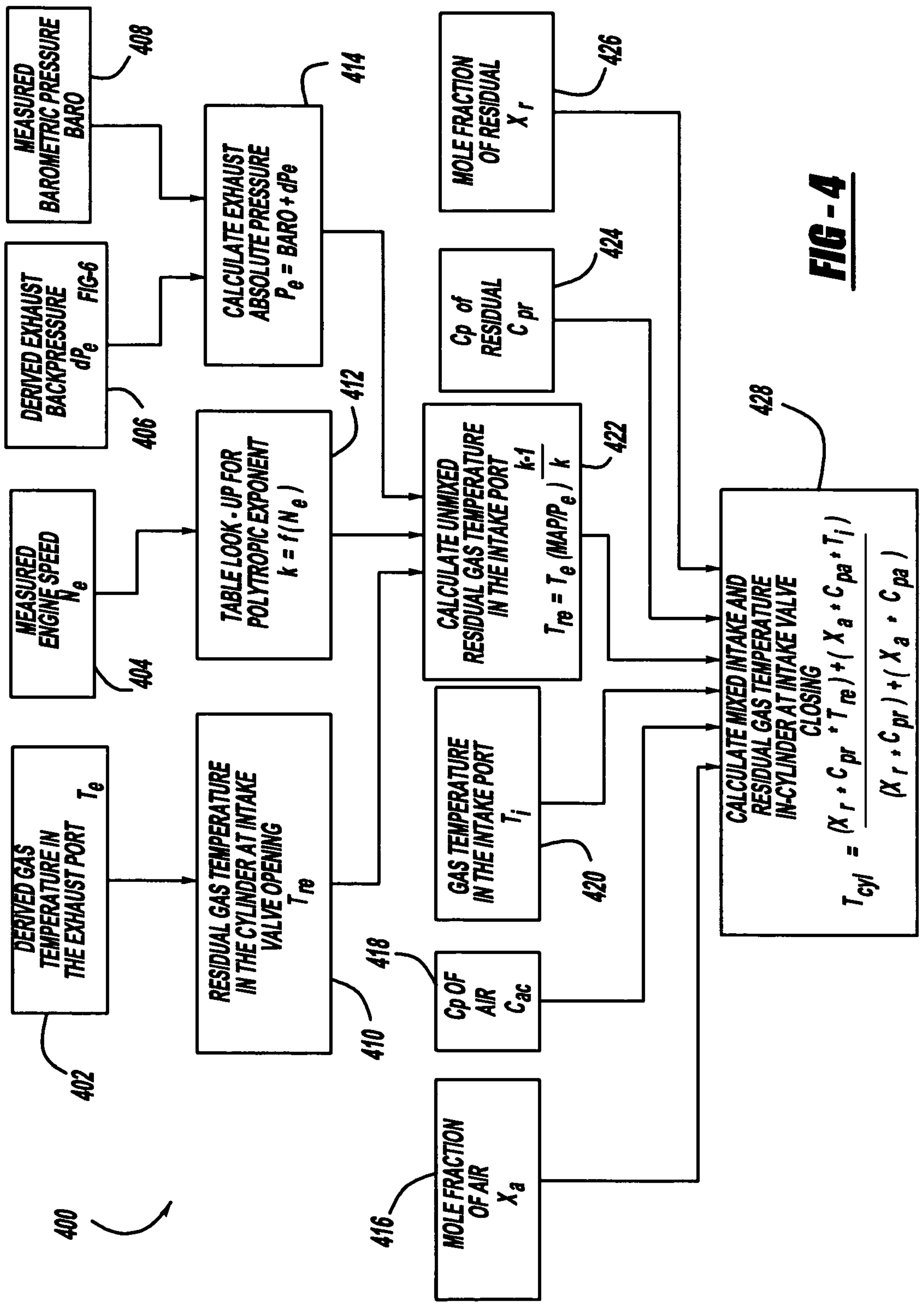
FIG. 4 is a model for obtaining mixed intake air and residual exhaust gas temperature in the selected cylinder at intake valve closing.

With reference to FIG. 4, block diagram 400 sets forth the determination of the mixed intake and residual gas temperature in a selected cylinder at intake valve closing using tabular and/or surface models, measured engine parameters and calculations.

Inputs to the gas temperature determination model of FIG. 4 are derived gas temperature in the exhaust port $T_e$ at block 402, engine speed $N_e$ at block 404, a derived exhaust back pressure dPe at block 406 (which is determined in accordance with either FIG. 6 or FIG. 7 as will be discussed below), and barometric pressure BARO at block 408.

At block 410 residual exhaust gas temperature in the selected cylinder at the opening of the intake valve is determined from a lookup table model as a function of the exhaust gas temperature at block 402.

At block 412 a polytropic exponent k is derived via table lookup and is a function of engine speed.

At block 412 the exhaust absolute pressure $P_e$ is calculated in accordance with $$P_e=BARO+dP_e.$$

At block 422 the unmixed residual gas temperature in the engine intake port $T_{re}$ is calculated in accordance with $$T_{re} + T_e * (MAP/P_e)\frac{k-1}{k}.$$

Finally, at block 428 the mixed intake and residual gas temperature in the cylinder of interest at intake valve closing is calculated in accordance with $$T_{cyl} = \frac{[(X_r * C_{pr} * T_{re}) + (X_a * C_{pa} * T_i)]}{[(X_r * C_{pe}) + (X_a * C_{pa})]}$$

where $T_i$ is the gas temperature at the engine intake port, $C_{pr}$ is the specific heat of the residual exhaust gas and $C_{pa}$ is the specific heat of air.

Figure 5:
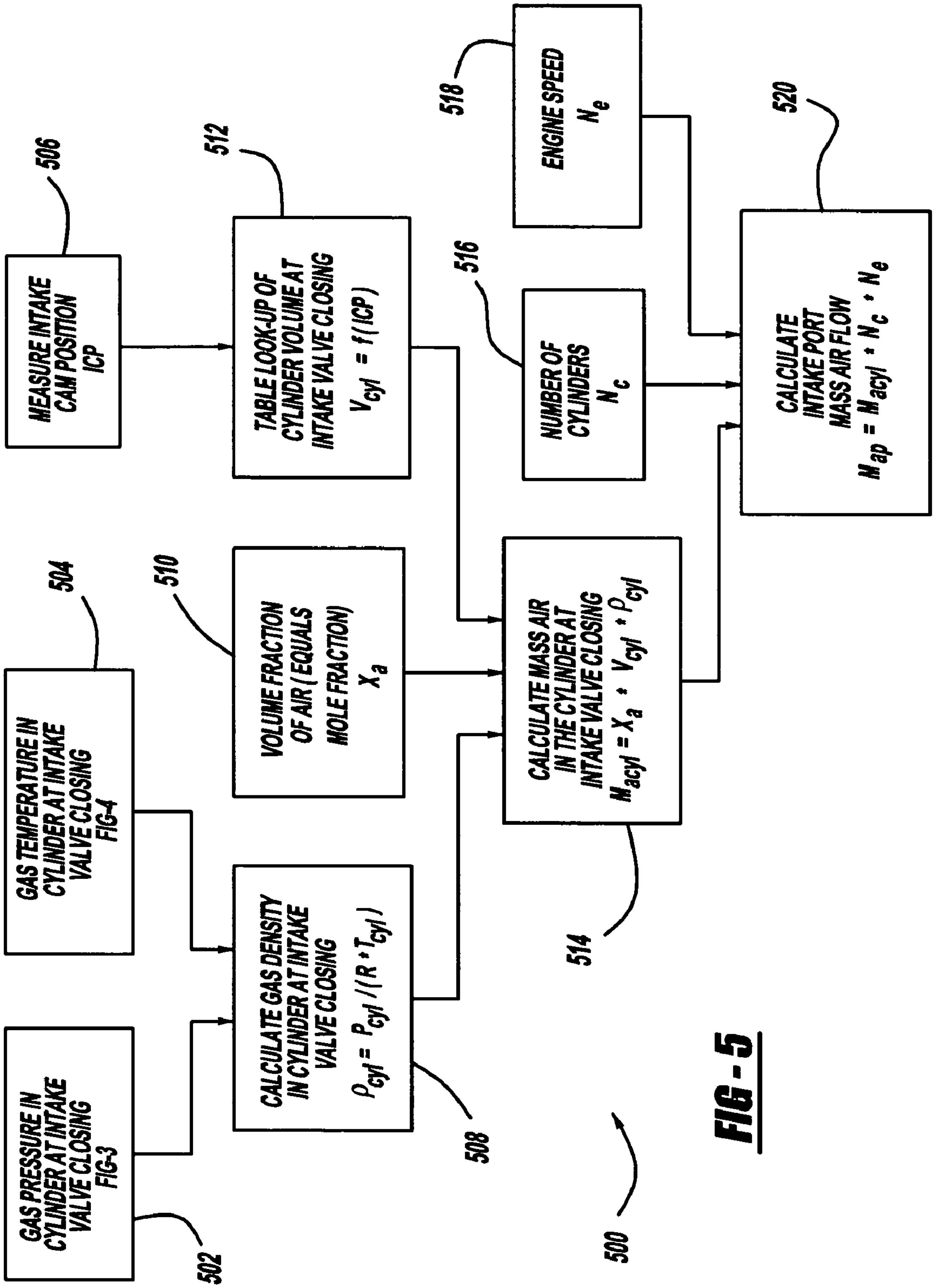
FIG. 5 is a model for obtaining air mass in the selected cylinder and engine intake port mass airflow.

With reference to FIG. 5, block diagram 500 sets forth the determination of mass air in the selected cylinder at intake valve closure and mass air flow at the engine intake port using tabular and/or surface models, measured engine parameters and calculations.

The basic inputs to this model are gas pressure in the cylinder at intake valve closing as derived from the model of FIG. 3 at block 502, gas temperature in the cylinder at intake valve closing at block 504 as determined by the model of FIG. 4, intake cam position ICP at block 506, mole fraction of air $X_a$ at block 510, the number of cylinders $N_c$ in the engine at block 516 and engine speed $N_e$ at block 518.

At block 508, the gas density in the cylinder at intake valve closing is calculated in accordance with $$\rho_{cyl}=P_{cyl}/(R*T_{cyl})$$

where $\rho_{cyl}$ is the gas density, $P_{cyl}$ is the cylinder gas pressure at intake valve closing, R is the universal gas constant and $T_{cyl}$ is the mixed intake air and residual gas temperature in the cylinder at intake valve closing.

At block 512, the cylinder volume at intake valve closing is derived via a table lookup and is a function of the intake cam position.

At block 514 mass air in the cylinder at intake valve closure is calculated in accordance with $$M_{acyl}=X_a*V_{cyl}*\rho_{cyl}$$

where $M_{acyl}$ is the mass air, and $V_{cyl}$ is the cylinder volume at intake valve closure derived at block 512.

Finally, at block 520 engine intake port mass airflow $M_{ap}$ is calculated in accordance with $$M_{ap}=M_{acyl}*N_c*N_e.$$

Figure 6:
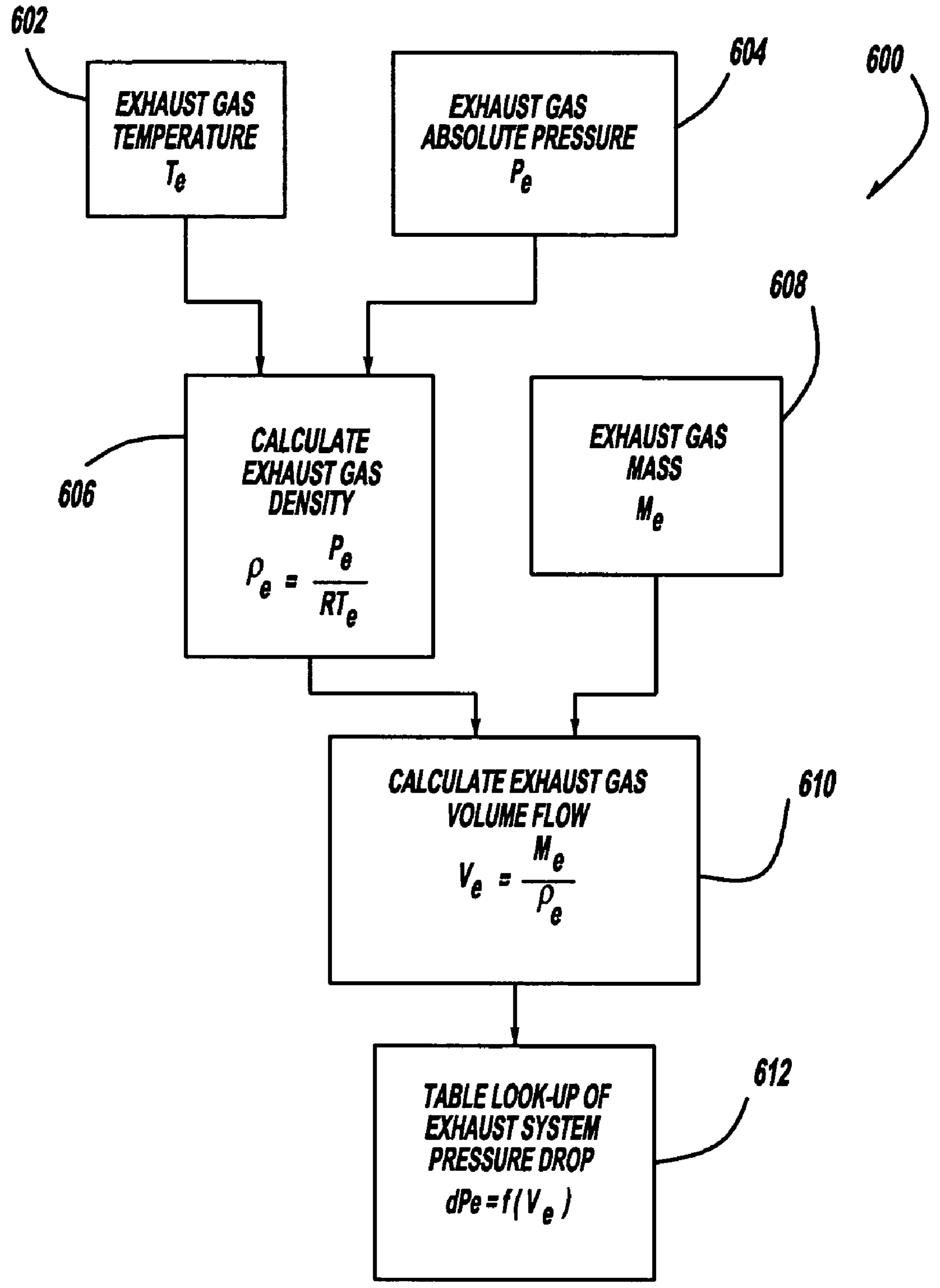
FIG. 6 is a model for obtaining the exhaust system back pressure drop for use in the model of FIG. 4.

Exhaust system back pressure $dP_e$ is determined via the model of FIG. 6 for those vehicle engines not employing a turbocharger. Exhaust gas temperature at block 602 and exhaust gas absolute pressure at block 604 are used to calculate exhaust gas density at block 606 in accordance with $$\rho_e=P_e/RT_e.$$

The exhaust gas density and the exhaust gas mass at block 608 are then used to calculate exhaust gas volume flow in accordance with $$V_e=M_e/l_e.$$

Finally, via a table lookup, the exhaust system pressure drop is derived at block 612 and is a function of exhaust gas volume flow.

Figure 7:
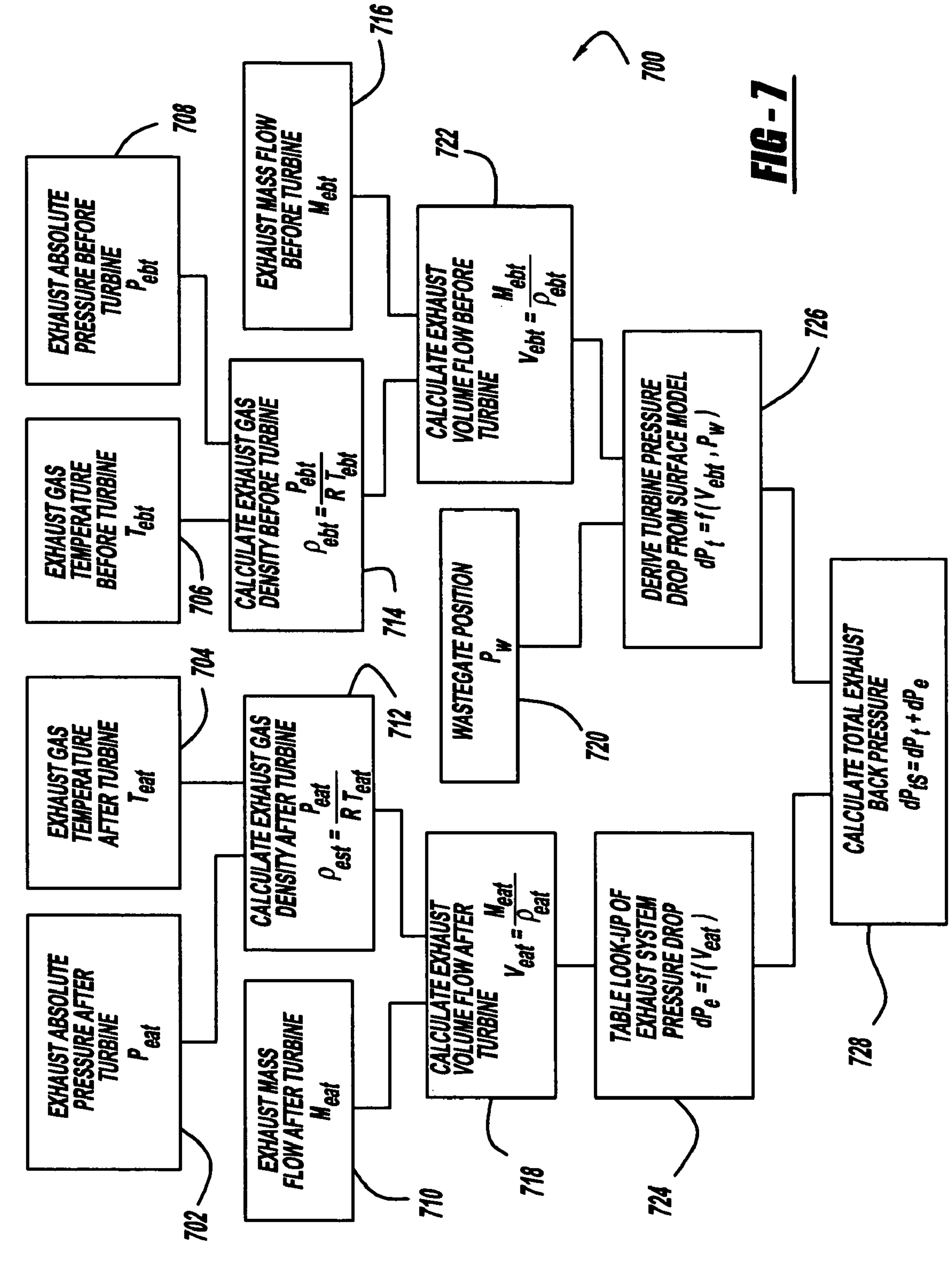
FIG. 7 is a modification of the model of FIG. 6 for obtaining exhaust back pressure in engines equipped with a turbo charger.

Engines employing a turbocharger with a fan or turbine acting as an air pump for intake air enhancement use the exhaust back pressure model of FIG. 7. Model 700 is similar to model 600 but takes into account the effects of the turbocharger turbine on the gas pressure and temperatures used in deriving total exhaust back pressure.

At block 712 the exhaust gas density after the turbine is calculated at block 712 using exhaust absolute pressure after the turbine at block 702 and exhaust gas temperature after the turbine at block 704 in accordance with $$\rho_{eat}=P_{eat}/(R*T_{eat})$$

where $\rho_{eat}$ is the exhaust gas density after the turbine, $P_{eat}$ is the exhaust gas pressure after the turbine and $T_{eat}$ is the exhaust gas temperature after the turbine, each derived from tabular or surface-type lookup models.

At block 714 the exhaust gas density before the turbine is calculated in accordance with $$\rho_{ebt}=P_{ebt}/(R*T_{ebt})$$

using exhaust gas temperature before the turbine, $T_{ebt}$, and exhaust absolute pressure before the turbine at block 708, $P_{ebt}$, both derived from surface lookup models.

At block 718 the exhaust volume flow after the turbine is calculated in accordance with $$V_{eat}=M_{eat}/\rho_{eat}$$

where $V_{eat}$, is the exhaust volume flow after the turbine, $M_{eat}$ is the exhaust mass flow after the turbine and $\rho_{eat}$ is exhaust gas density after the turbine.

At block 722, exhaust volume flow before the turbine is calculated using the exhaust gas density before the turbine at block 714 and the exhaust mass flow before the turbine at block 716, or $$V_{ebt}=M_{ebt}/\rho_{ebr}.$$

At block 724, the exhaust system pressure drop dPe is derived from a table lookup as a function of the exhaust volume flow after the turbine at block 718.

At block 726, the turbine pressure drop is derived from a surface model at block 726 as a function the exhaust volume flow before the turbine at block 722 and the position of a waste gate at block 720, $p_w$. The waste gate is essentially a controllable relief valve to ensure that the turbine of the turbocharger does not run too fast, by opening a bleed-off passage to the main exhaust system.

Finally, at block 728, total exhaust back pressure is calculated in accordance with $$dP_{ts}=dP_t+dP_e$$

where $dP_t$ is the pressure drop of the turbine and dPe is the pressure drop of the exhaust back pressure. This value $dP_{ts}$ is then used at block 406 of the model of FIG. 4 for those vehicles employing a turbocharger.

Using the method of the invention has been shown to significantly lower the number of tables and surfaces and the required collection of calibration data required with conventional control schemes. With the use of detailed mass, pressure and temperature information, model based engine operating parameter control becomes feasible, including spark timing control, air/fuel ratio control and engine output torque control.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling an operating condition of a vehicle engine comprising:

calculating mole fractions of residual exhaust gas and air in a selected cylinder at the end of an intake stroke of a piston associated with a select cylinder;

calculating gas pressure in the selected cylinder upon closure of an intake valve of the selected cylinder;

calculating mixed intake air and residual exhaust gas temperature in the selected cylinder upon the closure of the intake valve;

calculating mass airflow at an intake port of the engine using the calculated gas pressure and the calculated gas temperature and the mole fraction of air in the selected cylinder; and estimating, using the calculated mass airflow, an operating parameter of the vehicle engine to achieve a preselected vehicle operating condition.

2. The method of claim 1 wherein the operating parameter comprises air/fuel ratio.

3. The method of claim 1 wherein the operating parameter comprises spark timing for the selected cylinder.

4. The method of claim 1 wherein the operating parameter comprises engine output torque.

5. The method of claim 1 further comprising:

prior to calculating mixed intake air and residual exhaust gas temperature in the selected cylinder at closure of the intake valve, deriving an exhaust system back pressure drop from calculated exhaust gas volume flow and adding the back pressure drop to calculated exhaust absolute pressure.

6. The method of claim 1 wherein calculating mole fractions of residual exhaust gas and air in a selected cylinder comprises:

measuring vehicle engine speed;

measuring manifold absolute pressure of the vehicle engine;

measuring barometric pressure;

determining residual exhaust partial pressure ratio in the selected cylinder based on measured engine speed;

calculating a pressure ratio by dividing measured manifold absolute pressure by measured barometric pressure;

calculating a mole fraction of residual exhaust gas for the selected cylinder by dividing the residual exhaust partial pressure ratio by the pressure ratio; and calculating the mole fraction of air as one (1.0) minus the mole fraction of residual exhaust gas.

7. The method of claim 6 further comprising:

measuring intake cam position for the selected cylinder;

measuring exhaust cam position for the selected cylinder;

determining a valve overlap modifier using the intake and exhaust cam positions; and modifying the mole fraction of residual exhaust gas with the valve overlap modifier.

8. The method of claim 1 wherein calculating gas pressure in the selected cylinder upon closure of the intake valve of the selected cylinder comprises;

measuring manifold absolute pressure of the vehicle engine;

measuring vehicle engine speed;

determining engine intake port gas temperature;

calculating gas density in the intake port by dividing the manifold absolute pressure by the product of the ideal gas constant for air and the intake port gas temperature;

determining dynamic pressure in the selected cylinder as a function of engine speed and the gas density in the intake port; and calculating the gas pressure in the selected cylinder as the sum of the dynamic pressure and the manifold absolute pressure.

9. The method of claim 8 further comprising:

measuring exhaust cam position of the selected cylinder;

measuring intake cam position of the selected cylinder;

determining a cam position modifier as a function of exhaust and intake cam positions; and modifying the calculated gas pressure in the selected cylinder with the cam position modifier.

10. The method of claim 8 further comprising:

measuring position of a variable charge motion device adjacent the intake valve;

measuring vehicle engine speed;

determining a variable charge motion device modifier as a function of vehicle engine speed in variable charge motion device positions; and modifying the calculated gas pressure in the selected cylinder with the variable charge motion device modifier.

11. The method of claim 8 further comprising:

determining a state of a manifold tuning valve;

determining a state of a short runner valve; and determining dynamic pressure in the selected cylinder as a function of engine speed, gas density in the intake port, and the determined states of the manifold tuning and short runner valve.

12. The method of claim 1 wherein calculating mixed intake air and residual exhaust gas temperature in the selected cylinder upon the closure of the intake valve comprises:

measuring vehicle engine speed;

measuring barometric pressure;

measuring manifold absolute pressure;

determining gas temperature in an exhaust port of the engine;

determining exhaust gas back pressure;

determining residual exhaust gas temperature in the selected cylinder at intake valve opening;

determining a polytropic exponent as a function of engine speed;

calculating an exhaust absolute pressure as the sum of the barometric pressure and the exhaust back pressure;

determining unmixed residual exhaust gas temperature in the intake port as a function of the residual exhaust gas temperature in the selected cylinder at intake valve closing, the exhaust absolute pressure, the polytropic exponent and the manifold absolute pressure; and calculating mixed intake air and residual exhaust gas temperature as a function of the mole fraction of air in the selected cylinder, the mole fraction of the residual exhaust gas in the selected cylinder, specific heat of air, specific heat of the residual exhaust gas, gas temperature in the intake port, and the unmixed residual exhaust gas temperature in the intake port.

13. The method of claim 12 wherein determining exhaust gas pressure comprises:

determining exhaust gas temperature;

determining exhaust gas absolute pressure;

determining exhaust gas density as a function of exhaust gas temperature and absolute pressure;

calculating exhaust gas volume flow by dividing exhaust gas mass by the exhaust gas density; and determining exhaust system back pressure as a function of exhaust gas volume flow.

14. The method of claim 1 wherein calculating mass airflow comprises:

measuring vehicle engine speed;

measuring an intake cam position for the selected cylinder;

calculating gas density in the selected cylinder at intake valve closing as a function of gas pressure and the mixed intake air and residual exhaust gas temperature in the selected cylinder at intake valve closing;

determining a volume of the selected cylinder at intake valve closing as a function of the intake cam position;

calculating mass of air in the selected cylinder at intake valve closing as a function of the mole fraction of air in the selected cylinder at intake valve closing, the volume of the selected cylinder and the gas density in the selected cylinder at intake valve closing; and calculating intake port mass airflow as a function of the mass air in the selected cylinder, the engine speed and the number of cylinders in the engine.

* * * * *